Figure 1:
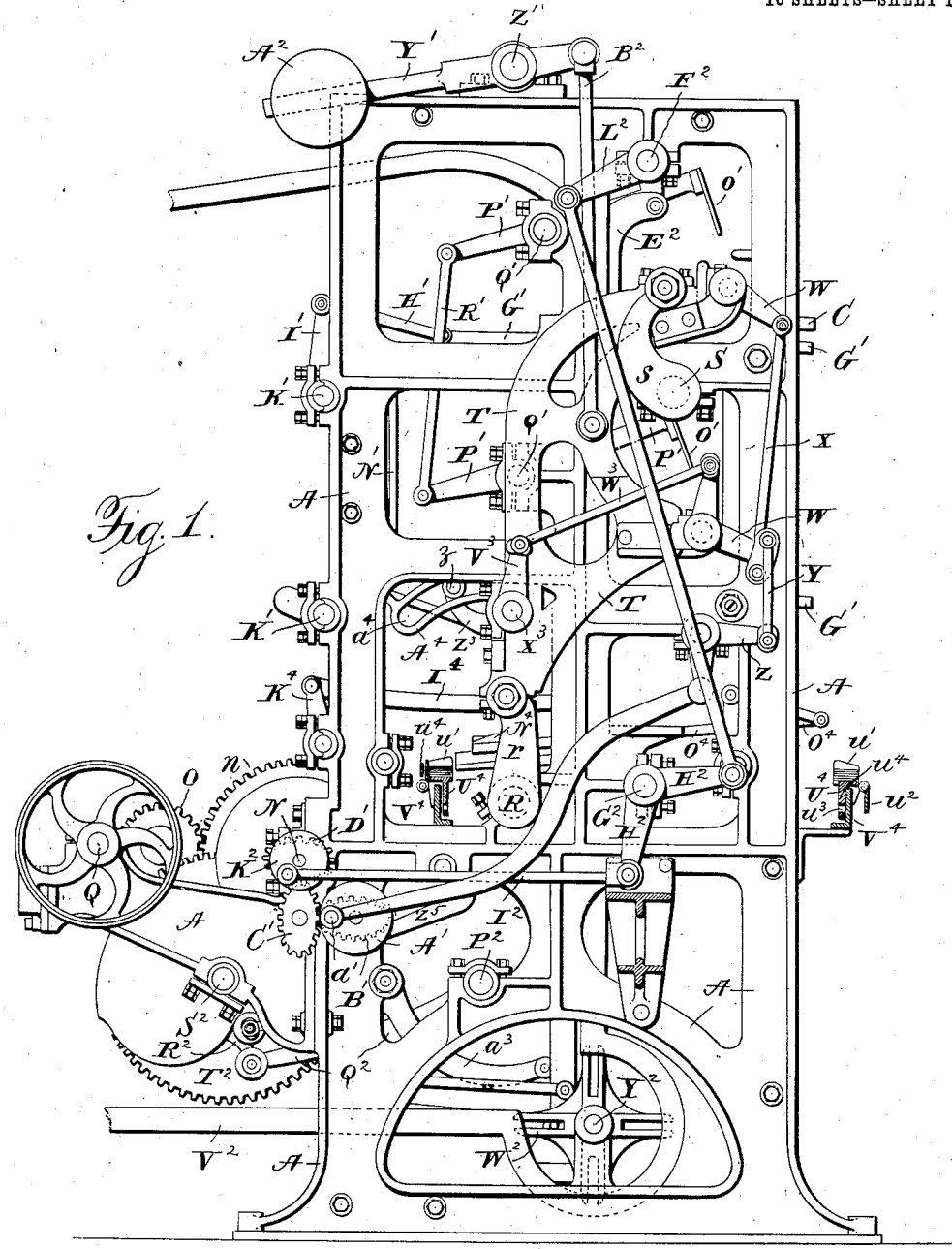

No. 761,773. PATENTED JUNE 7, 1904.
A. LAGERMAN.
MACHINE FOR INSERTING MATCH SPLINTS INTO PERFORATED BLOCKS, &c.,
AND REMOVING THEM THEREFROM.
APPLICATION FILED AUG. 17, 1899. RENEWED SEPT. 18, 1900.

NO MODEL. 10 SHEETS—SHEET 1.

Witnesses:
Jas. E. Hutchinson.
Henry C. Hazard.

Inventor.
Alexander Lagerman, by
Prindle & Russell, his attys.

No. 761,773. PATENTED JUNE 7, 1904.
A. LAGERMAN.
MACHINE FOR INSERTING MATCH SPLINTS INTO PERFORATED BLOCKS, &c.,
AND REMOVING THEM THEREFROM.
APPLICATION FILED AUG. 17, 1899. RENEWED SEPT. 18, 1900.
NO MODEL. 10 SHEETS—SHEET 2.

Witnesses:
Jas. E. Hutchinson
Henry C. Hazard

Inventor.
Alexander Lagerman, by
Prindle & Russell, his Attys

No. 761,773. PATENTED JUNE 7, 1904.
A. LAGERMAN.
MACHINE FOR INSERTING MATCH SPLINTS INTO PERFORATED BLOCKS, &c.,
AND REMOVING THEM THEREFROM.
APPLICATION FILED AUG. 17, 1899. RENEWED SEPT. 18, 1900.
NO MODEL. 10 SHEETS—SHEET 3.

Witnesses:
Jas. E. Hutchinson
Henry C. Hazard

Inventor.
Alexander Lagerman, by
Prindle & Russell, his Attys.

No. 761,773. PATENTED JUNE 7, 1904.
A. LAGERMAN.
MACHINE FOR INSERTING MATCH SPLINTS INTO PERFORATED BLOCKS, &c.,
AND REMOVING THEM THEREFROM.
APPLICATION FILED AUG. 17, 1899. RENEWED SEPT. 18, 1900.

NO MODEL. 10 SHEETS—SHEET 4.

Witnesses:
Jas. E. Hutchinson
Henry C. Hazard

Inventor:
Alexander Lagerman, by
Prindle and Russell, his Attys.

No. 761,773. PATENTED JUNE 7, 1904.
A. LAGERMAN.
MACHINE FOR INSERTING MATCH SPLINTS INTO PERFORATED BLOCKS, &c.,
AND REMOVING THEM THEREFROM.
APPLICATION FILED AUG. 17, 1899. RENEWED SEPT. 18, 1900.

NO MODEL. 10 SHEETS—SHEET 5.

Witnesses:
Jas E Hutchinson
Henry C Hazard

Inventor.
Alexander Lagerman, by
Crindle & Russell, his Attys

No. 761,773. PATENTED JUNE 7, 1904.
A. LAGERMAN.
MACHINE FOR INSERTING MATCH SPLINTS INTO PERFORATED BLOCKS, &c.,
AND REMOVING THEM THEREFROM.
APPLICATION FILED AUG. 17, 1899. RENEWED SEPT. 18, 1900.
NO MODEL. 10 SHEETS—SHEET 6.
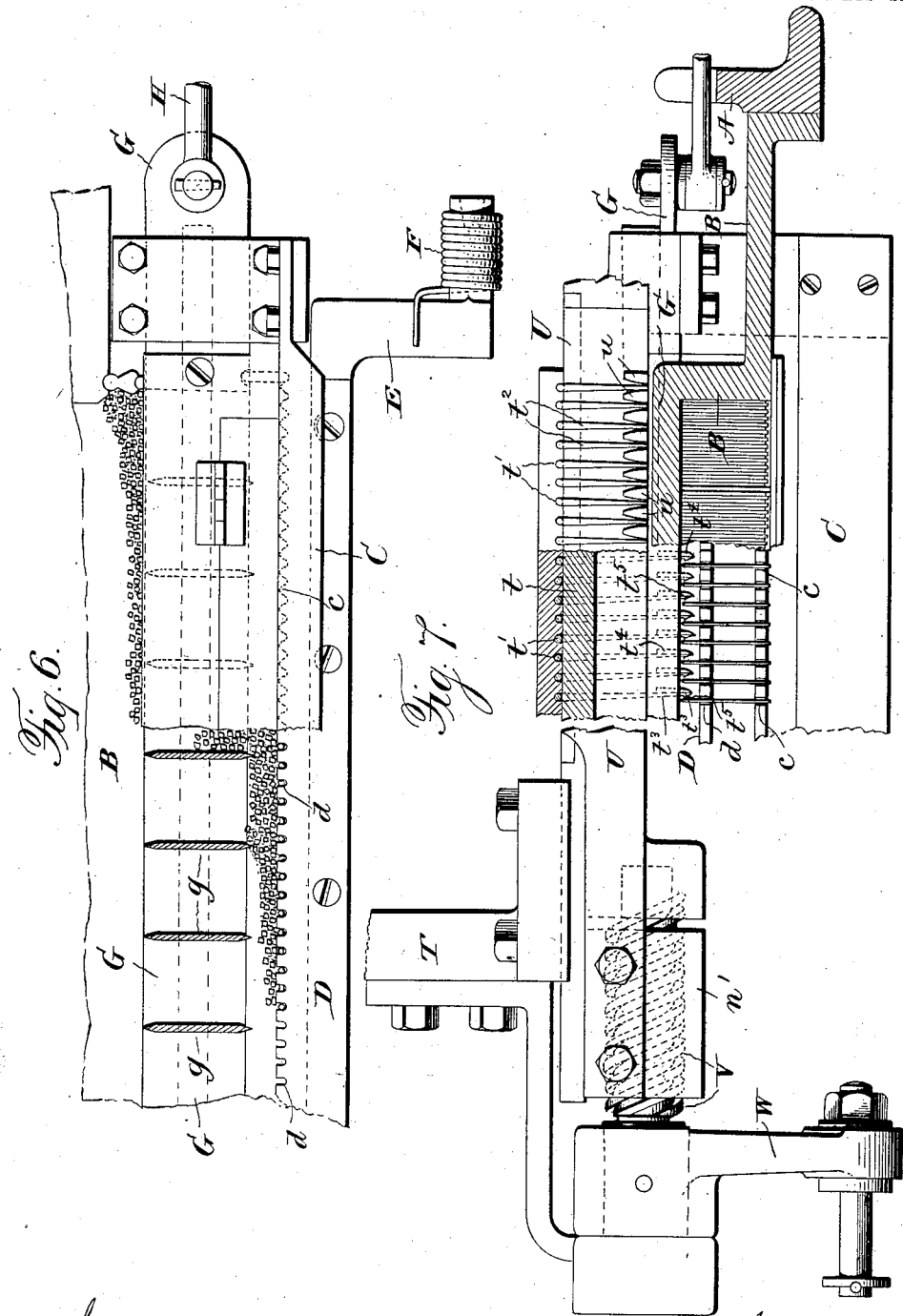

No. 761,773. PATENTED JUNE 7, 1904.
A. LAGERMAN.
MACHINE FOR INSERTING MATCH SPLINTS INTO PERFORATED BLOCKS, &c.,
AND REMOVING THEM THEREFROM.
APPLICATION FILED AUG. 17, 1899. RENEWED SEPT. 18, 1900.
NO MODEL.
10 SHEETS—SHEET 7.
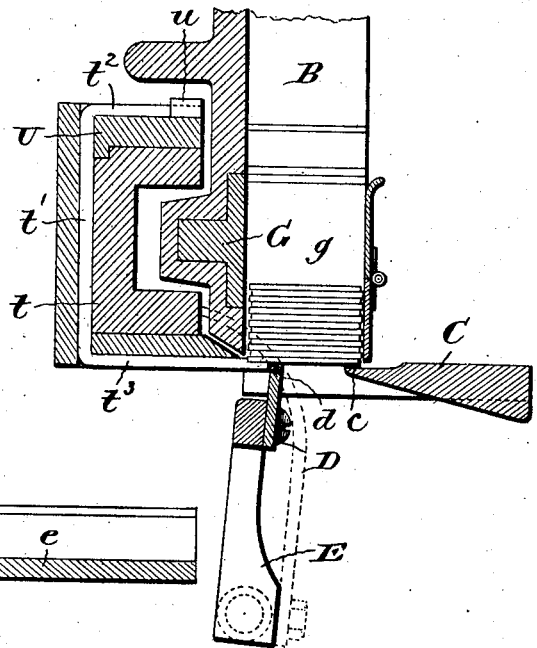
Fig. 8.
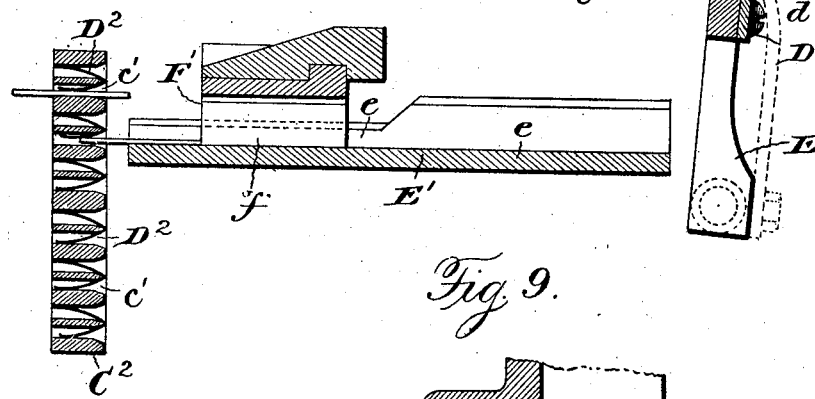
Fig. 9.
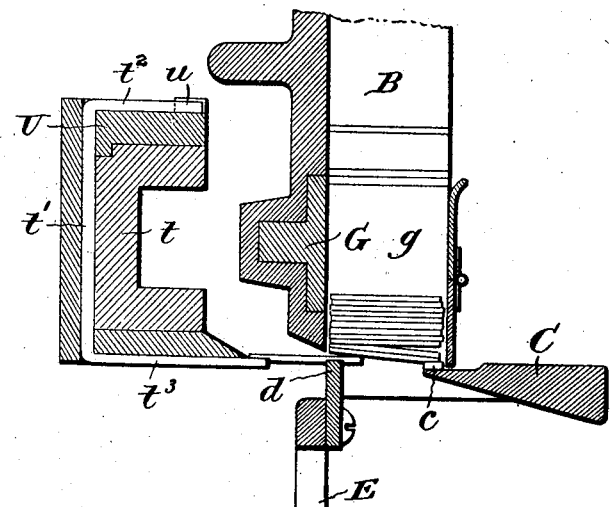
Witnesses:
Jas. E. Hutchinson
Henry C. Hazard.
Inventor.
Alexander Lagerman, by
Grindle & Russell, his Attys.

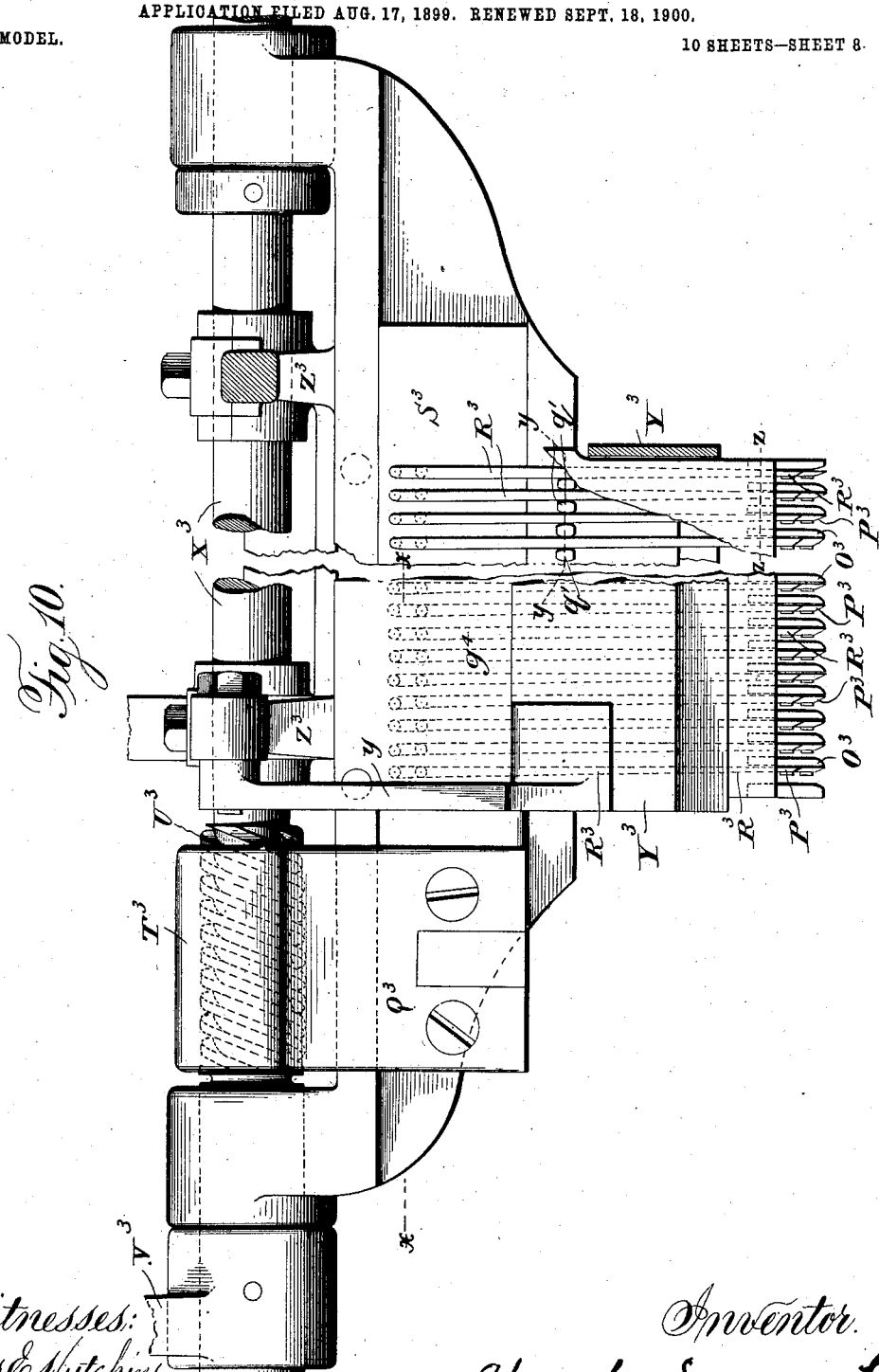

No. 761,773. PATENTED JUNE 7, 1904.
A. LAGERMAN.
MACHINE FOR INSERTING MATCH SPLINTS INTO PERFORATED BLOCKS, &c.,
AND REMOVING THEM THEREFROM.
APPLICATION FILED AUG. 17, 1899. RENEWED SEPT. 18, 1900.
NO MODEL.
10 SHEETS—SHEET 9.
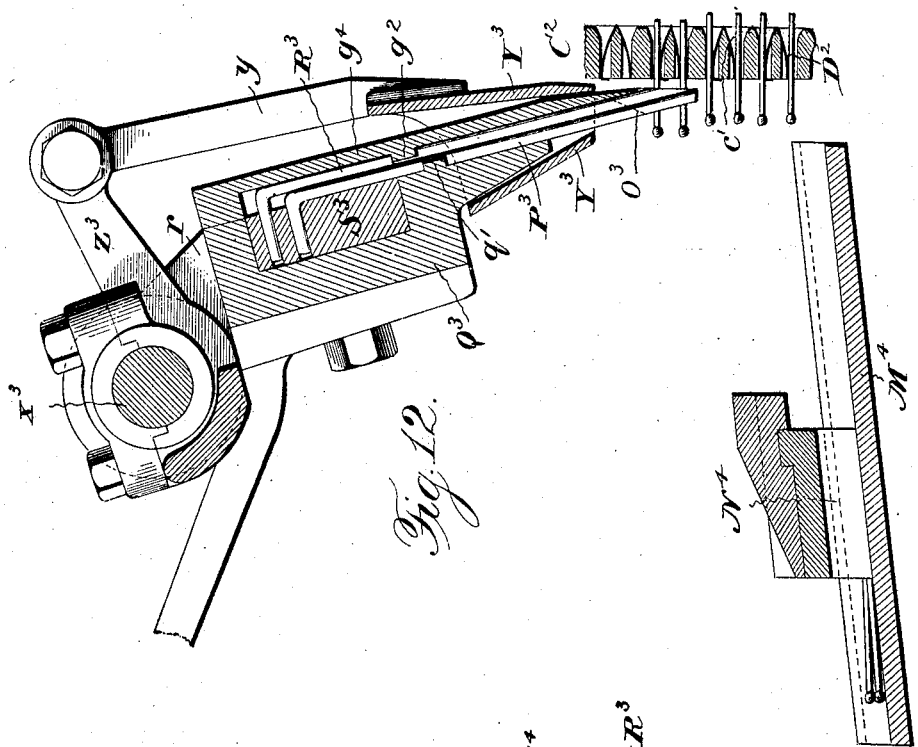
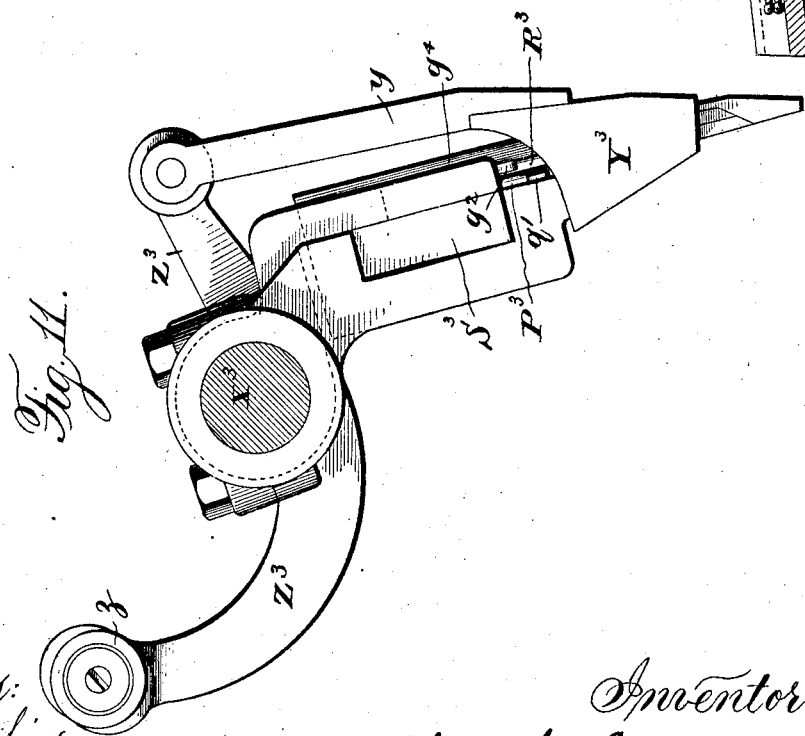
Witnesses:
Jas. E. Hutchinson
Henry C. Hazard
Inventor.
Alexander Lagerman, by
Prindle & Russell, his Atty No. 761,773. PATENTED JUNE 7, 1904.
A. LAGERMAN.
MACHINE FOR INSERTING MATCH SPLINTS INTO PERFORATED BLOCKS, &c.,
AND REMOVING THEM THEREFROM.
APPLICATION FILED AUG. 17, 1899. RENEWED SEPT. 18, 1900.
NO MODEL. 10 SHEETS—SHEET 10.
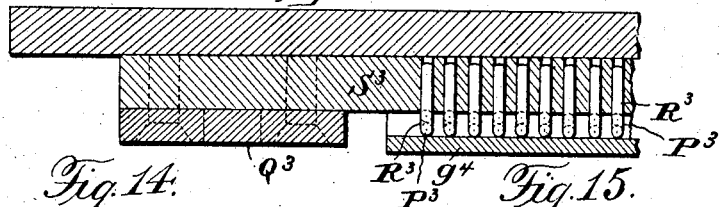
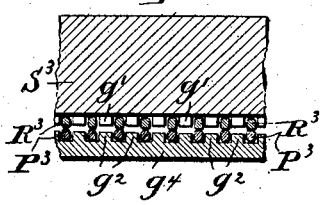
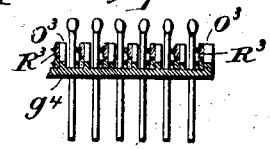
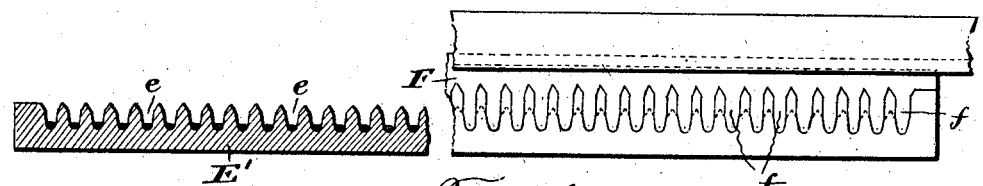
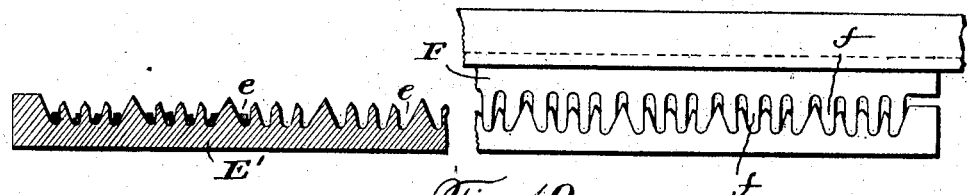
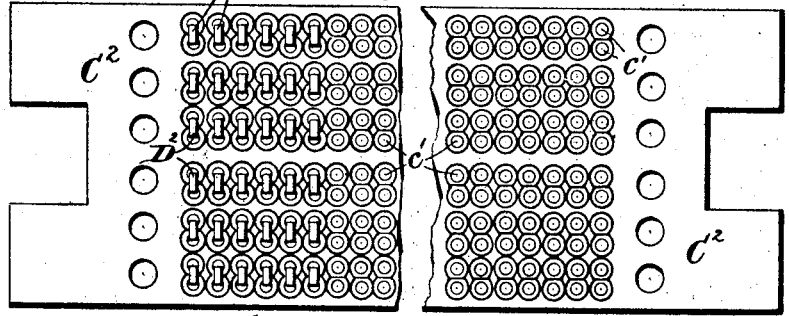
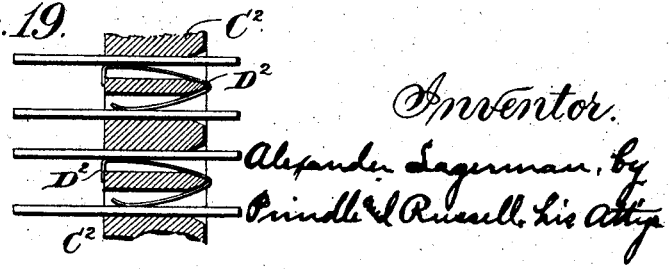
Witnesses:
Jas. E. Hutchinson
Henry C. Hazard
Inventor.
Alexander Lagerman, by
Prindle & Russell, his Attys.
THE NORRIS PETERS CO., PHOTO-LITHO., WASHINGTON, D. C.

No. 761,773. Patented June 7, 1904.

UNITED STATES PATENT OFFICE.

ALEXANDER LAGERMAN, OF JÖNKÖPING, SWEDEN, ASSIGNOR, BY MESNE ASSIGNMENTS, TO THE DIAMOND MATCH COMPANY, OF NEW YORK, N. Y., A CORPORATION OF ILLINOIS.

MACHINE FOR INSERTING MATCH-SPLINTS INTO PERFORATED BLOCKS, &c., AND REMOVING THEM THEREFROM.

SPECIFICATION forming part of Letters Patent No. 761,773, dated June 7, 1904.

Application filed August 17, 1899. Renewed September 18, 1900. Serial No. 30,438. (No model.)

*To all whom it may concern:*

Be it known that I, ALEXANDER LAGERMAN, a resident of Jönköping, Sweden, have invented certain new and useful Improvements in Match-Machines; and I do hereby declare that the following is a full, clear, and exact description thereof, reference being had to the accompanying drawings, in which—

Figure 2:
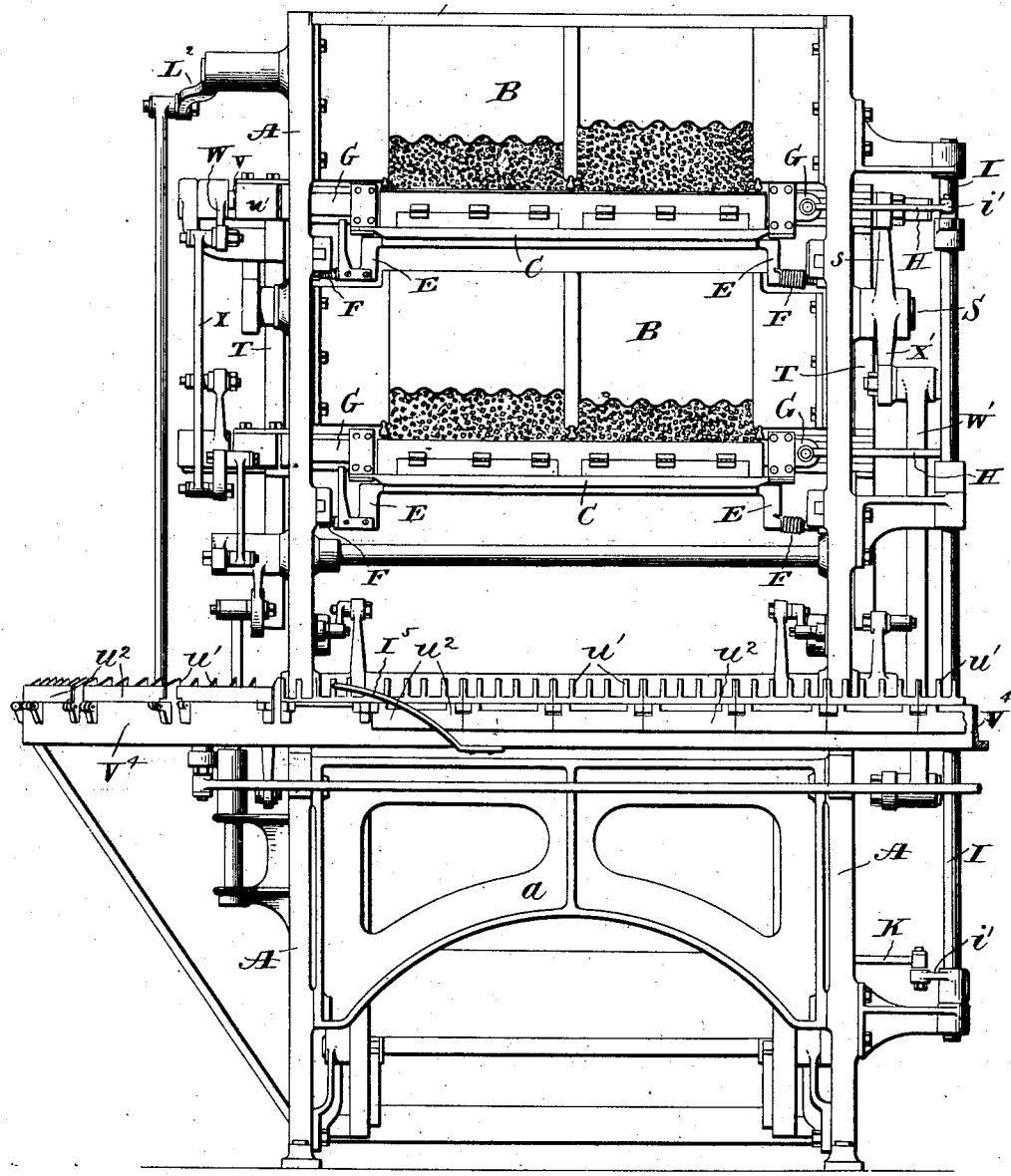
Figure 3:
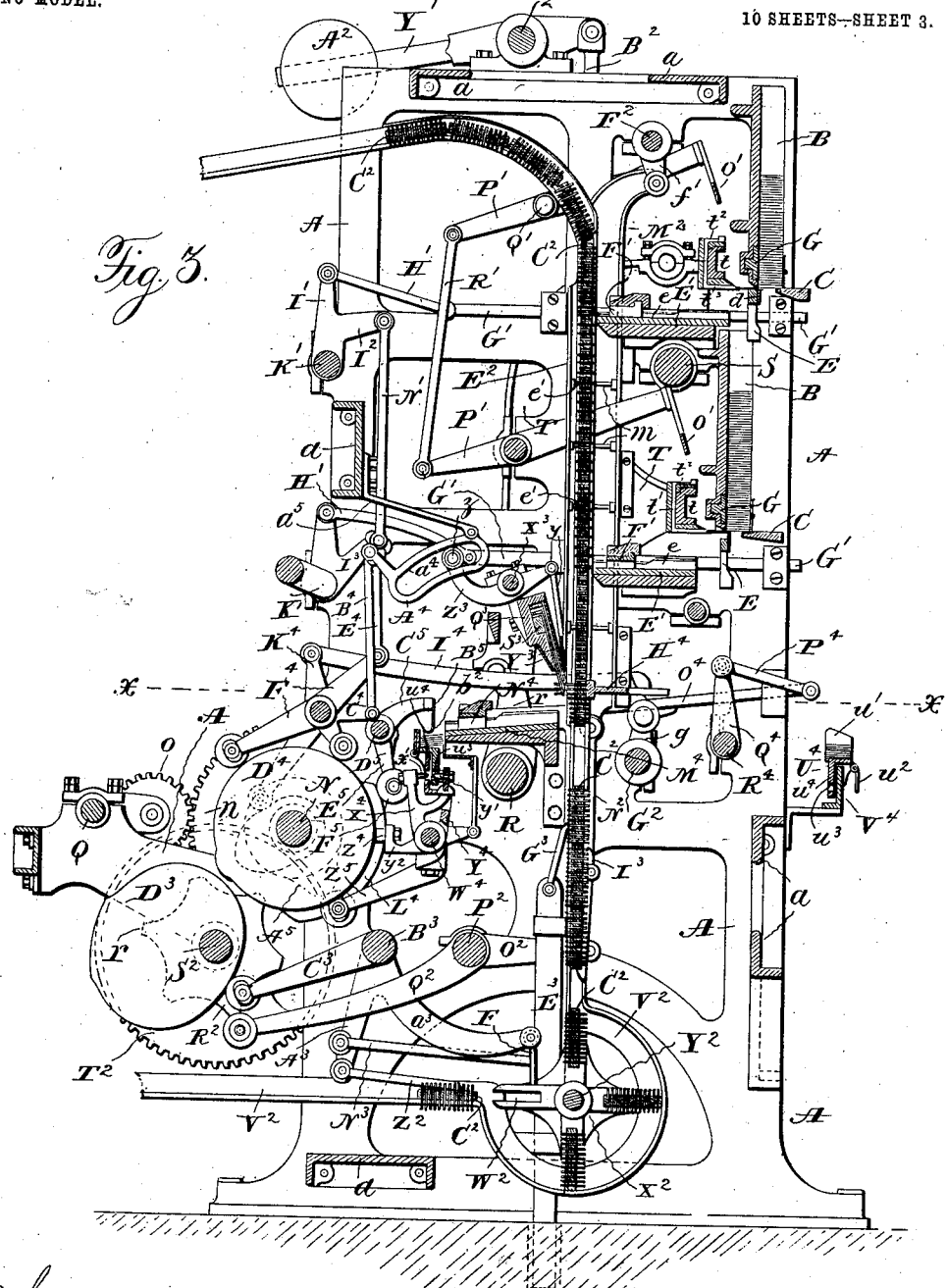
Figure 4:
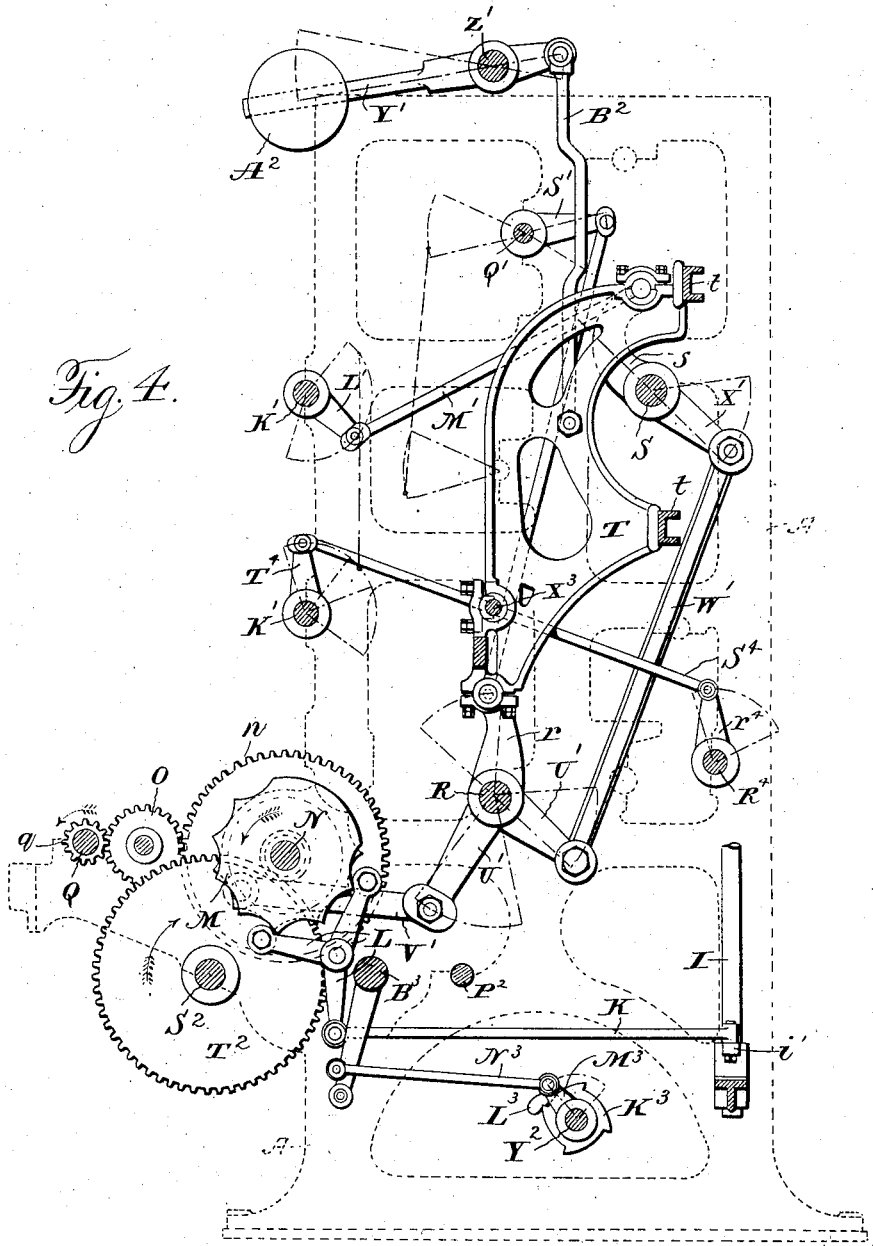
Figure 5:
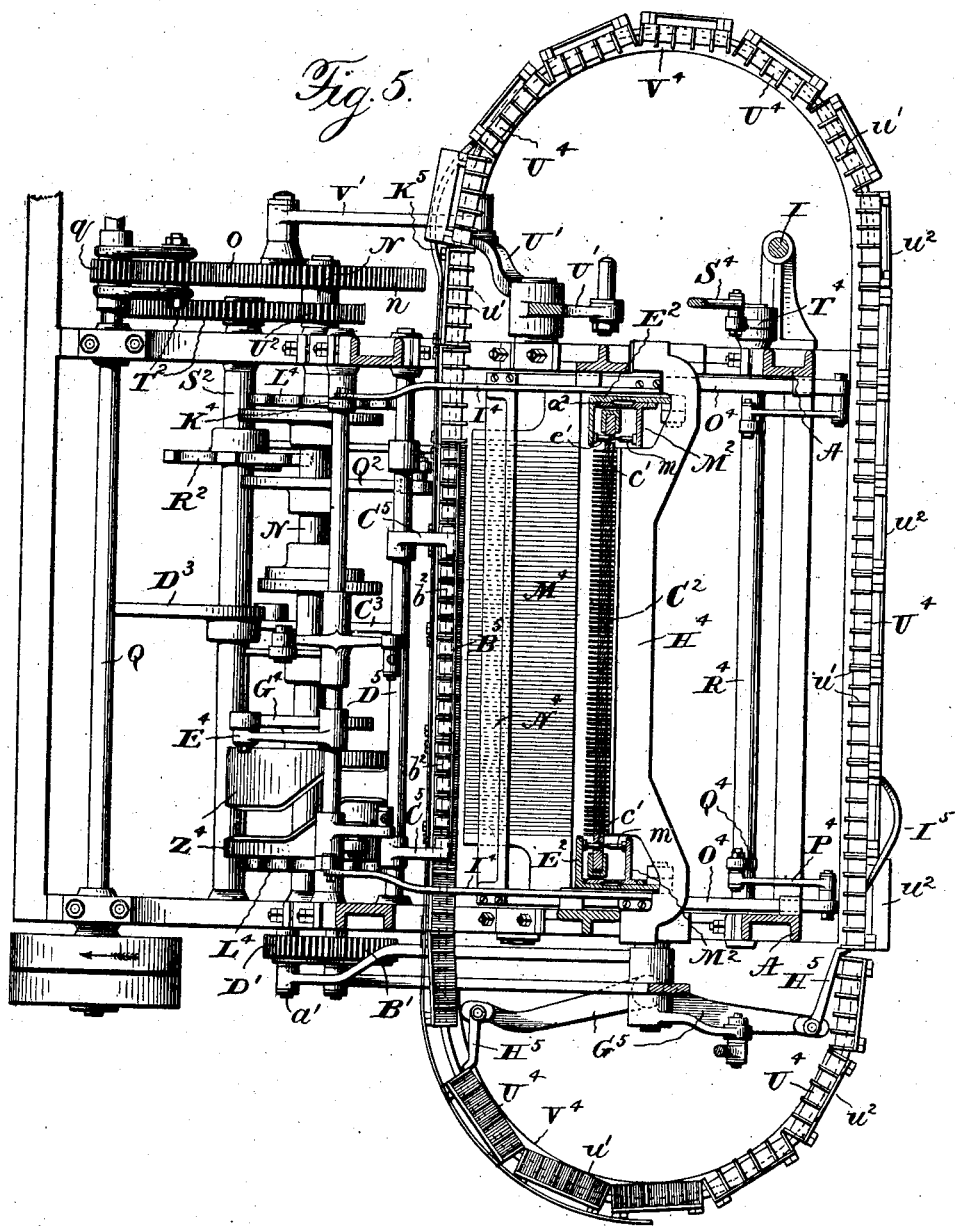

Figure 1 is a side elevation of a match-machine embodying my invention; Fig. 2, an end elevation thereof; Fig. 3, a vertical longitudinal section; Fig. 4, a similar view, parts being omitted; Fig. 5, a horizontal section on the line $xx$ of Fig. 3; Fig. 6, a detail view, on a larger scale, of a portion of the lower part of one of the splint hoppers or magazines; Fig. 7, a similar view thereof in horizontal section and of the splint-extracting devices. Figs. 8 and 9 are detail views, in vertical section, of said devices, showing, respectively, the positions of parts when splints are about to be grasped by the grippers and when they have been partially withdrawn by the latter; Fig. 10, a detail top plan view of the match-gripper mechanism; Fig. 11, an end elevation thereof; Fig. 12, a vertical section of said mechanism; Fig. 13, a section thereof on the line $xx$ of Fig. 10; Fig. 14, a similar section on the line $yy$ of Fig. 10; Fig. 15, a like section on the line $zz$ of Fig. 10. Figs. 16 and 17 are respectively detail views, partly in elevation and partly in section, of the splint and match receiving tables and their combs; Fig. 18, a detail view in elevation of portion of one of the carrier-plates; and Fig. 19, a detail view in section, on a larger scale, of portion of said plate.

Letters of like name and kind refer to like parts in each of the figures.

The object of my invention is to provide improvements in match-machines of the description in which splints are placed in carriers by which they are dipped or treated to form matches and then the completed matches removed from the carriers; and to this end my invention consists in the machine having the features of construction substantially as hereinafter specified.

The particular type of machine in which I have embodied my improvements is one in which splints already formed are placed in magazines or hoppers, from which they are taken and placed in carriers composed of separate perforated plates, by which they are held and presented to the various treating devices and from which the completed matches are discharged. It is to be understood, however, that when those features of the invention which are applicable to machines of other types are so applied they are considered to be within the scope of my invention.

In the embodiment of the invention selected for illustration a frame is employed that comprises two vertical side pieces A and A and cross-pieces or stays $a$ and $a$, uniting the latter. Supported on the upper part of the frame, at the front side thereof, are preferably two splint magazines or hoppers B and B, one being higher than the other. The splints are supported in each magazine, at the bottom thereof, by a horizontal plate C, which projects a short distance within the magazine from the front side thereof, where it is provided with uniformly-spaced depressions $c$ and $c$ and a bar D at the rear side of the magazine, also having depressions $d$ and $d$ in line with the depressions $c$ and $c$, the lowermost splints at opposite ends resting in the depressions in the two parts. The bar D is attached to a pivoted frame E, so that for a reason to appear the bar may be moved a short distance inward beneath the hopper and back again. It is yieldingly held in the latter position by a coiled spring F. Within the lower part of each magazine is a horizontal slide G, from which projecting into the hopper are vertical division-plates $g$ and $g$, which by the reciprocation of the slide jar or shake the splints downward, causing the lowermost ones to be seated in the depressions of the supports C and D. (See Figs. 6 and 7.) For vibrating the slide it is connected at one end by a link H with a crank $i$ on a vertical rock-shaft I, journaled in brackets on the frame and having at its lower end a crank $i'$, which is connected by a link K to one arm of a three-armed lever L, the other two arms of the latter being in engagement with the scalloped periphery of a wheel M on a shaft N. By the revolution of the wheel M the lever is vibrated, and the rocking of the shaft to produce the reciprocation of the slide G is produced. The shaft N has a gear-wheel $n$, through which by an intermediate gear O, in mesh with a pinion $q$ on a driving-shaft Q, power is taken from the latter to revolve said shaft N.

Hung on a pair of cranks $r$ and $r$ on a shaft R and a pair of cranks $s$ and $s$ on a shaft S is a frame composed of side pieces T and T and cross-bars $t$ and $t$, connecting them. The shafts R and S are in different horizontal and vertical planes, the former being higher and farther toward the front of the machine, and the cranks are so disposed that the frame has a movement downward and rearward or upward and forward. The cross-bars $t$ and $t$ are in different horizontal planes and are respectively near the two splint-magazines, being in rear thereof. Pivoted to each of the bars are a number of round vertical rods $t'$ and $t'$ each having at its upper end a horizontal extension $t^2$ and at its lower end a longer horizontal extension $t^3$, which and an adjacent lug $t^4$ on the bar form the jaws of a pair of splint-grippers adapted to clamp and hold between them the end portion of a splint. The end portion of the upper extension $t^2$ lies between lugs $u$ and $u$ on the upper side of a slide-bar U, mounted on the cross-bar $t$, so that by the reciprocation of the slide the rod $t'$ will be rocked and the jaw $t^3$ be moved to and from its fixed jaw $t^4$ to respectively grip and release a splint. The better to grip and hold a splint the jaw $t^3$ is provided with a spur or tooth $t^5$, that enters or penetrates the splint. Engaging an interiorly-threaded part or nut $u'$ at one end of the slide U is a multiple-threaded, preferably quadruple-threaded, screw V, to which is attached a crank-arm W. As there are two slides U there are two crank-arms, one higher than the other, and they are connected by a link X. The lower crank-arm W is connected by a link Y to one arm of a bell-crank lever Z, to the other arm of which is attached one end of a rod, whose other end is pivoted to a crank-pin $a'$ on a disk A' on the same shaft with an elliptical gear B', in mesh with a similar idler gear C', that meshes with and is driven by an elliptical gear D' on the shaft N.

Below each of the splint-gripper devices is a horizontal table E', whose upper side is formed into forwardly and rearwardly extending grooves $e$ and $e$, the same in number as the number of splint-grippers, and into which splints from the latter are delivered and from which they are moved endwise into the carriers by a reciprocating comb-like bar F', the teeth $f$ and $f$ of which respectively are seated in the grooves. At its opposite ends the bar or crank F' is connected to horizontal bars G' and G', mounted in guides on the inner side of the respective frame sides A and A and connected at their rear ends by links H' and H' to cranks I' and I' on a rock-shaft K'. In the case of the rock-shaft for the comb of the upper table a crank L' on said shaft is connected by a link M' with the pivot-pin, by which the gripper-carrying frame is connected with the upper arms W and W, while a link N' connects a crank $I^2$ of the upper shaft with a crank $I^3$ of the lower shaft. Thus the rocking of both shafts and the reciprocation of the combs are effected from the motion of the gripper-carrying frame. It will be understood that the grippers are moved to and fro between the magazines and the tables and that they are opened to release the splints when the latter are close to the tables. As it is possible that splints may adhere to the grippers when the latter are opened, and so fail to fall to the tables, means are provided for dislodging any that may so adhere, which means consist for each set of grippers of a plate or thin bar O', carried by levers P' and P' on a rock-shaft Q', by the movement of which the bar is swung down and up in front of the grippers, striking in its descent any splints that adhere thereto and knocking them therefrom. Levers of the two splint-striking bars are connected by a link R', and on the upper rock-shaft is a crank S', that is connected by a link T' with the pivot by which the arms W and W, which support the gripper-carrying frame, are attached to the latter. The movements of the splint-knockers are thus also produced from the motion of said frame.

For moving the gripper-carrying frame a crank U' on the shaft R is pivotally connected to a link or rod V', that is pivoted to a crank-pin $o$ on the gear-wheel $n$, said shaft R being thus rocked, while to similarly rock the shaft S a right-angled extension of the crank U' is connected by a link W' with a crank X' on the rock-shaft S. To balance the gripper-carrying frame, levers Y' and Y' on a shaft Z', mounted on the top of the frame sides A and A, are each provided with weights $A^2$ and $A^2$ and are connected by links $B^2$ and $B^2$ with the frame sides T and T.

The carriers consist each of a plate $C^2$ thinner than the splints are long, having numerous uniformly-spaced splint-receiving openings $c$, adapted each to contain a splint. Within each pair of adjacent openings are the respective legs of a V-shaped spring $D^2$, the latter thus straddling the partition or portion of the plate between adjacent openings and being held by a right-angled extension of one of the legs taking over the side of said partition opposite the apex of the V. There is thus a spring within each opening between which and the opposing side of the opening the splint is held. The carrier-plates $C^2$ and $C^2$ pass close to the rear sides of the tables $E'$ and $E'$ through vertical guides $a^2$ and $a^2$, respectively, on the inner sides of the frame sides A and A, being moved upward therethrough by steps. Adjacent to the opposite end portions of the carrier-plates in the guides are two vertical bars $E^2$ and $E^2$, that at their upper and lower ends, respectively, are pivotally connected to crank-arms $f'$ and $f'$ on a rock-shaft $F^2$ and crank-arms $g$ and $g$ on a rock-shaft $G^2$, the positions of said arms being such that by their action the bars are moved horizontally. On an inwardly-projecting portion of each bar $E^2$ are horizontal pins $e'$ and $e'$, that by the horizontal reciprocation of the bars are moved into and out of holes $c'$ and $c'$ in the carrier-plates, the latter being locked or held from movement in the former case and free to move when the pins and openings are disengaged. The rock-shafts $F^2$ and $G^2$ are simultaneously rocked by connecting one arm of a bell-crank lever $H^2$ on the shaft $G^2$, by means of a link $I^2$, with an eccentric-pin on a disk $K^2$ on the shaft, with the elliptical gear $D'$ and connecting the other arm of said lever $H^2$ with a crank $L^2$ on the shaft $F^2$. Mounted in guides in the two bars $E^2$ and $E^2$, and so partaking of their horizontal movement, are two vertically-movable slide-bars $M^2$ and $M^2$, having on the side of the carrier-plates opposite the pins $e'$ and $e'$ pins $m$ and $m$, that are movable into and out of the same holes $c'$ and $c'$, being moved into them when the pins $e'$ and $e'$ are moved out and out of them when said pins $e'$ and $e'$ are moved in. (See Fig. 5.) When the pins $m$ and $m$ engage the holes, the slide-bars $M^2$ and $M^2$ are moved upward, and the carrier-plates are likewise moved upward, and when the pins $m$ and $m$ are withdrawn from the holes the bars are moved downward. For so moving said bars vertically the lower end of each is connected by a link $N^2$ with a crank $O^2$ on a rock-shaft $P^2$, having an arm $Q^2$, that coacts with a cam $R^2$ on a shaft $S^2$. The cam has its arm-engaging portion formed of a series of scallops, and as the travel of the plates must be periodically increased on account of the greater distance between the nearest row of splint-receiving openings in adjacent plates one of the scallops is formed to secure such periodic increase of travel, the ridge $r$ thereof being of greater radius than are those of the other scallops. The shaft $S^2$ has a gear-wheel $T^2$, which meshes with a pinion $U^2$ on the shaft N, and thus said shaft $S^2$ is driven from the latter.

The carrier-plate guides at the top of the machine are curved upward and outward and thence incline downward, so that the filled plates may pass from the machine for the dipping of the splints by hand or in another machine, and when the matches are thus completed the plates are returned to the machine, being placed in horizontal guides $V^2$ and $V^2$ near the bottom of the machine. From said guides $V^2$ and $V^2$ the plates, one at a time, are passed into one of several radial slots $W^2$ and $W^2$ of a rotary transfer device $X^2$ on a shaft $Y^2$, that is at the point where the guides $V^2$ and $V^2$ would intersect the guides $W^2$ and $W^2$ were they extended. By the revolution of the rotary device $X^2$ the carrier-plates are successively carried from a horizontal position to a vertical position, and during the turning of said device they are retained in the slots thereof by engaging concentric continuations of the guides $V^2$ and $V^2$. The plates are moved into the device $X^2$ by a pawl $Z^2$ at each end thereof, that is reciprocated by a lever $A^3$, to which it is connected and which is secured to a rock-shaft $B^3$, having an arm $C^3$ in engagement with a cam $D^3$ on the shaft $S^2$. For moving the plates from the device $X^2$ into the vertical guides $a^2$ and $a^2$ and for advancing the plates along the latter there is adjacent to each end thereof a vertically-movable bar $E^3$, that is connected by a link $F^3$ with an arm or extension $a^3$ of the lever $A^3$ and carries two pawls $G^3$ and $H^3$, that respectively engage the plates to move them from the device $X^2$ and to move them along the vertical guides. When lifted from the device $X^2$ by the pawls $G^3$ and $G^3$, a plate is held, when said pawls descend by a catch or dog $I^3$, pivoted adjacent the guide $a^2$, that engages the lower edge of the plate.

For intermittently rotating the transfer device $X^2$ the shaft $Y^2$ thereof has a ratchet-wheel $K^3$, with the teeth of which engages a pawl $L^3$, pivoted to an arm $M^3$, hung loosely on the shaft $Y^2$ and connected by a link $N^3$ to the lever $A^3$.

Lower down than and on the side of the carrier-plates opposite the devices for placing the splints in the latter are devices substantially similar in construction to said devices— that is, they comprise splint-gripping means for drawing the matches from the plates and a grooved table to which the matches are dropped. The grippers are composed of fixed jaws $O^3$ and $O^3$ and two sets of movable jaws composed of rods overlying each other in pairs, so that the lower ends of a pair cooperate with a single fixed jaw $O^3$, one set of rods $P^3$ and $P^3$ being fulcrumed between lugs $q'$ and $q'$ on a cross-bar $Q^3$ and the other set of rods $R^3$ and $R^3$ being fulcrumed between lugs $q^2$ and $q^2$ on a plate $q^3$, that covers the rods and is attached to said cross-bar $Q^3$. At their upper ends the rods are bent at right angles and engage a slide-bar $S^3$, mounted on the cross-bar $Q^3$, which bar by its reciprocations rocks the rods to open and close the grippers. A nut $T^3$ on the slide and a multiple-threaded screw $U^3$ are provided for operating the slide similar to those employed with the heretofore-described splint-grippers, there being attached to the screw a lever $V^3$, which is connected by a link $W^3$ to an arm of the crank W. The screw $U^3$ is formed on a shaft $X^3$, supported by bearings at the lower end of the frame sides A and A. The jaw-rods are arranged in pairs, as above described, so that two rows of matches may be simultaneously engaged and extracted, and each jaw has a splint-penetrating tooth. Provision is also made, as in the case of the other grippers, for dislodging any matches tending to adhere to the grippers, which provision consists of two connected thin plates $Y^3$ and $Y^3$, respectively, on opposite sides of the series of jaws to engage splints on both sides of the latter, said plates being connected by a bar $y$ to a lever $Z^3$, pivoted to turn on the screw-shaft $X^3$. The lever $Z^3$ by a roller $z$ is in engagement with a slot $a^4$ in an arm $A^4$, pivoted at one extremity to a bracket $a^5$, attached to one of the frame cross-pieces $a$, and at its other extremity is connected by a link $B^4$ to a lever $C^4$, that is actuated by a cam $D^4$ on the shaft N. As for a purpose to hereinafter appear it is desirable to give the match-grippers an oscillatory motion in addition to that of the frame that supports them, their supporting-bar $Q^3$ is hung or pivoted to the screw-shaft $X^3$ and has a rearwardly-extending arm $q^4$, which by a link $E^4$ is connected to a lever $F^4$, actuated by a cam $G^4$ on the shaft N.

On the side of the carrier-plates opposite the match-grippers is a bar $H^4$, extending transversely of and is reciprocable horizontally to and from the plates, being connected at each end to a bar $I^4$, that is pivoted to a lever $K^4$, actuated by a cam $L^4$ on the shaft N. When moved toward the plates, the bar $H^4$ engages the ends of match-splints protruding therefrom and pushes the matches so that they project farther than before on the sides of the plates near the match-grippers, and thus are presented in better position for engagement by the grippers.

The table $M^4$, to which the matches are delivered, is similar in construction to the tables $E'$ and $E'$, but preferably inclines, as shown, and for moving the matches from the table there is a comb $N^4$, which, through a bar $O^4$ at each end and a link $P^4$, pivoted to the bar, is connected to a lever $Q^4$ on a rock-shaft $R^4$. Motion is imparted to the latter by connecting a crank $r^4$ on it through a rod or link $S^4$ with a crank $T^4$ on the lower rock-shaft $K'$. From the table $M^4$ the matches may be delivered to any desired receptacle; but preferably I employ a series of boxes $U^4$ and $U^4$ on an endless track $V^4$, on which the boxes move contiguous to the delivery end of the table and thence to the front of the machine, (see Fig. 5,) where the matches may be conveniently removed from the boxes. Each of the latter is subdivided into compartments by vertical partitions $u'$ and $u'$, and on the side next which the match-heads lie is a hinged wall or door $u^2$. In consequence of the employment of the partitions $u'$ and $u'$ the ribs forming the grooves of the table $M^4$ are at points in line with said partitions made thicker to insure that no matches will fall onto the partitions.

Mounted on a shaft $W^4$ beneath the portion of the track adjacent the table $M^4$ (see Fig. 3) are two arms $X^4$ and $Y^4$, which, respectively, project on opposite sides of the track and have studs or pins $x$ and $y'$ that, by the rocking of the arms, alternately engage holes $u^3$ and $u^3$ in flanges $u^4$ and $u^4$, that depend from the boxes alongside the track. The arm $X^4$ is fixed to the shaft $W^4$, but the arm $Y^4$ is loose thereon, so as to be movable along the same axially by a cam $Z^4$ on the shaft N, with which an extension $y^2$ of the arm engages. Its rocking movement is therefore secured by engaging it with a groove $x'$ in the arm $X^4$, which while causing the two arms to rock together permits the arm $Y^4$ to be moved in an axial direction. When the stud of the arm $Y^4$ is engaged with a box-hole, the arm is moved by the cam in the direction to move the box onward, and when it is freed from said hole the arm is moved in the opposite directions. The stud of the arm $X^4$ when engaged with a box-hole holds the box from movement. For rocking the arms the shaft $W^4$ has an arm $Z^5$, that is actuated by a cam $A^5$ on the shaft N. The matches falling into the boxes are gently pressed or packed down therein by a series of pressers $b^2$ and $b^2$ equal to the number of box-compartments opposite the table at a time, (see Figs. 3 and 5,) that depend from a plate $B^5$, attached to arms $C^5$ and $C^5$ on a rock-shaft $D^5$, that has an arm $E^5$, actuated by a cam $F^5$ on the shaft N. The series of boxes do not completely fill the track, so that those that are filled can be moved on ahead to the emptying-point, and thus afford a longer period of time for emptying than would otherwise be the case, the ones being filled being permitted a faster onward movement, due to the space thus provided between them and the one next in advance thereof. For thus advancing the filled boxes a horizontal lever $G^5$, vibrated in any desired way, is provided with two diametrically opposite feed-pawls $H^5$ and $H^5$, that engage the boxes at two separated points along the track. The hinged sides or doors of the boxes are automatically opened for emptying the boxes by a pointed bar $I^5$, adjacent to the track, with which the box-doors engage as the boxes travel along, and they are automatically closed just before the boxes reach the filling point by means of a cam-form bar or rail $K^5$ adjacent to the track, with which they engage as the boxes are moved onward.

Briefly described, the operation of the machine is as follows: Splints being supplied to the two magazines or hoppers B and B, they are shaken down in the lower parts thereof by the reciprocation of the slides G and G, certain of the lowermost splints being regularly spaced apart and supported at their extremities by the plate C and bar D. By reason of the space existing between the plate C and the bar D any broken splints or splints too short to be supported by said parts will fall out of the machine. The splint-gripper-carrying frame being moved to carry the grippers toward their respective magazines with the grippers open, the splint-supporting bars D and D will be engaged by the latter and pressed out of the way, exposing the rear ends of the splints and permitting them to be gripped by the grippers. Such movement of the splint-supporting bars D and D aids in the separation and dislodgment from the machine of any defective splints. The splints being caught by the grippers, the latter by the reverse movement of their supporting-frame will move from the magazines, drawing or extracting the gripped splints therefrom, and will then descend close to their respective grooved tables E' and E', and the jaws of the grippers being opened the splints will be released and fall into the grooves or be knocked therein by the splint-knockers O' and O' should they tend to adhere to the grippers. When thus seated in the table-grooves, the splints are moved therethrough and forced into the openings of the carrier-plates by the combs F' and F', between which and the plates of course the splints are deposited in the grooves, the carrier-plates being during such inserting operation held stationary by the pins of the locking-bars $E^2$ and $E^2$. Two rows of splints being thus placed in carrier-plates, the pins of the locking-bars are withdrawn from the latter, and the pins of the feeding-bars $M^2$ and $M^2$ engage therewith, and by the upward movement of the latter the plates are advanced twice the distance vertically between adjacent splint-openings. It will be evident that because of the employment of two splint-magazines, with accompanying splint extracting and inserting devices, the inserting devices must have such relative position that each inserts splints in vertically-alternate rows of splint-openings, and it is because of this that the amount of travel of the splint-carriers at each movement is that above stated. If, as may be the case, but a single splint-magazine is employed, the distance traveled by the plates in each movement will be equal simply to the space between adjoining rows of splint-openings. As the plates are filled with splints they are moved upward and outward and reaching a suitable point are removed from the machine for dipping to form the completed matches, and this having been done the plates containing the completed matches are returned to the machine and by the devices and in the manner hereinbefore described are presented in position for the operation of the match-extracting devices. The latter, being carried by the same frame which carries the gripping devices for the simple splints, are operated simultaneously with said gripping devices, so that the two operations of extracting splints from the splint-hoppers and completed matches from the carrier-plates are simultaneously performed. When the match-extracting devices approach the carrier-plates, they are moved by the swinging of their supporting-bar D on the shaft $X^3$ to carry the grippers slightly higher than the highest row of matches to enable the grippers to move close to the plates between the latter and the heads of the matches without danger of striking the match-heads. When thus moved close to the plates in rear of the match-heads, the grippers then descend in the spaces between the matches and grip the match-splints well in rear of the heads of the matches. Being thus gripped by the grippers the matches, by a horizontal movement of the latter, are drawn or pulled from the carrier-plate and then by a downward movement of the grippers are carried close to the grooved table E', and, being released, are dropped into the grooves thereof, such matches as tend to adhere to the grippers being dislodged therefrom by the descent of the knocker-plates O' and O'. Two rows of matches at a time are extracted by the grippers, because of the fact that the simple splints are supplied to the carrier-plates from two sources of supply, which necessitate, as above pointed out, twice the amount of travel of the carrier-plates than would be the case were there but a single source and means of supply of splints. As the matches of one of the rows of those extracted are directly above those of the other row extracted, it follows that two matches are dropped into each of the grooves of the table E', and in view of the closeness of the two rows at the time of their withdrawal and when they are dropped to the table they are practically or, in effect, but a single row, the matches of the upper row falling in orderly parallel arrangement adjacent those of the lower row, the importance of this feature of the machine being found in the fact that the splints or matches when dropped to the table are in perfectly-arranged position for removal therefrom, derangement being impossible, such as is apt to occur when a quantity or mass of matches or splints is dropped at once to a table. From the latter the matches are shoved or pushed by the comb $N^4$ into the boxes $U^4$ and $U^4$, by the movement of which, as hereinbefore described, they are carried to a convenient place for removal of the matches. The movement of the comb $N^4$, as is the case with that of the combs F', follows upon the delivery of the matches or splints from the grippers, so that the movement of the grippers and combs is in alternating sequence, the result being that each full or close row of matches or splints, as the case may be, is removed from the table by the combs before more splints can be delivered thereto by the grippers. The travel of the boxes along the table E' is so timed relative to the rate of extraction of the matches from the carrier-plates that said boxes receive the predetermined number of matches before they pass beyond said table.

It will be understood, of course, that many changes in the construction and arrangement of parts may be made which will involve no departure from the principle of my invention. Thus, besides the matters already spoken of, instead of employing a rotary transfer device for shifting the match-holding plates from the horizontal guides to the vertical guides said guides might be connected by a curved section, such as is shown in the upper part of the machine.

Having thus described my invention, what I claim is—

1. In a match-machine, the combination of a splint-holder, means for removing rows of splints therefrom comprising splint-engaging devices that extend between adjacent splints of a row or rows and draw the splints from the holder, a table to which the splints thus drawn are delivered in parallelism to form a single row, a receiving device adjacent said table, and automatic means for moving each of said rows of splints individually endwise from said table into the receiving device, the operation of said moving means alternating with that of the drawing device.

2. In a match-machine, the combination of a source of supply of splints, a traveling splint-carrier having rows of splint-receiving openings adapted each to contain a splint, a table, a transfer device having splint-gripping jaws by means of which a row of splints at a time is carried from the source of supply to the table in parallelism, and automatic means for moving each row of splints from the table into the respective openings of the carrier, the operation of said moving means alternating with that of the transfer device.

3. In a match-machine, the combination of a source of supply of splints, a traveling splint-carrier, a table, a transfer device having splint-gripping jaws by means of which a row of splints at a time is carried from the source of supply to the table in parallelism, and automatic means for moving each row of splints from the table into the carrier, the operation of such moving means alternating with that of the transfer device.

4. In a match-machine, the combination of a source of supply of splints, a traveling splint-carrier, a table provided with parallel grooves leading to said carrier, a transfer device having splint-gripping jaws by which a row of splints at a time is carried from the source of supply and delivered to the grooves of the table in parallelism, and automatic means to engage the splints in the grooves to move each row of the splints into the carrier, the operation of such splint-moving means alternating with that of the transfer device.

5. In a match-machine, the combination of a source of supply of splints, a splint-carrier, a table from which splints are supplied to the carrier, a transfer device having splint-gripping means, and means for causing splints to drop from said device to the table, substantially as and for the purpose described.

6. In a match-machine, the combination of a source of supply of splints, a splint-carrier, a table from which splints are supplied to the carrier, a transfer device having a series of splint-grippers and means for causing splints to drop from said device to the table, substantially as and for the purpose described.

7. In a match-machine, the combination of a source of supply of splints, a splint-carrier, a grooved table, a transfer device having a series of splint-grippers, means for causing splints to drop from said device to the table-grooves, and means for moving splints from the latter to the carrier, substantially as and for the purpose described.

8. In a match-machine, the combination of a source of supply of splints, a splint-carrier, a grooved table, a transfer device having a series of splint-grippers, means for causing splints to drop from said device to the table-grooves, and a sliding comb having splint-engaging teeth, substantially as and for the purpose described.

9. In a match-machine, the combination of a source of supply of splints, a splint-carrier, a grooved table close to the source of supply and to the path of the splint-carrier, a transfer device above the table and having a series of splint-grippers by which splints are extracted from the source of supply, means for causing splints to drop from said device to the table-grooves, and a sliding comb having splint-engaging teeth, substantially as and for the purpose described.

10. In a match-machine, the combination of a source of supply of splints, a device that draws splints from such source of supply, a table to which the splints are delivered from said device, a splint-carrier, and means to move splints from the table to the carrier, substantially as and for the purpose described.

11. In a match-machine, the combination of a source of supply of splints, a device that draws splints from such source of supply, having splint-grippers, a device for delivering splints from the grippers, a table, and means to move splints from the table to the carrier, substantially as and for the purpose described.

12. In a match-machine, the combination of a source of supply of splints, a device having splint-grippers, that draws splints from the source of supply, and a part movable crosswise of the splints as held by the grippers, to deliver them therefrom, substantially as and for the purpose described.

13. In a match-machine, the combination of a source of supply of splints, a device having splint-grippers, that draws splints from the source of supply, a part movable crosswise of the splints, as held by the grippers to deliver them therefrom, and a table having splint-receiving grooves to which the splints from the grippers fall, substantially as and for the purpose described.

14. In a match-machine, the combination of a carrier, a source of supply of splints, a device having splint-grippers, that draws splints from the source of supply, means for placing splints so drawn in the carrier, and a device for removing them from the carrier having splint-grippers, substantially as and for the purpose described.

15. In a match-machine, the combination of a splint-carrier, a source of supply of splints comprising a vertical magazine, means for separating from the splints in the latter a row of the lowermost splints, and a transfer device having splint-grippers that engage the splints of such row, substantially as and for the purpose described.

16. In a match-machine, the combination of a splint-carrier, a source of supply of splints comprising a vertical magazine, means for separating from the splints in the latter a row of the lowermost splints, a transfer device having splint-grippers that engage the splints of such row, a table to which the splints are delivered by said device, a splint-carrier, and means to move the splints from the table to the carrier.

17. In a match-machine, the combination of a plurality of magazines, a traveling carrier, said magazines being situated at different points along the path of the carrier, and means for removing splints from the magazines and placing them endwise in rows in the carrier, the rows of splints from one magazine alternating with the rows of splints from another, substantially as and for the purpose described.

18. In a match-machine, the combination of a traveling carrier, adapted to receive and hold splints for dipping, a plurality of magazines, situated at different points along the path of the carrier, means for removing splints from each magazine, and means for inserting the splints so removed endwise in rows, into the carrier, the rows of splints from one magazine alternating with the rows of splints from another, substantially as and for the purpose described.

19. In a match-machine, the combination of a plurality of magazines, a traveling carrier, said magazines being situated at different points along the path of the carrier, and means for removing splints from the magazines and thrusting them endwise into the carrier, the rows of splints from one magazine alternating with the rows of splints from another.

20. In a match-machine, the combination of a plurality of magazines, a traveling carrier, said magazines being situated at different points along the path of the carrier, means for removing the splints from the magazines, transporting them to and thrusting them endwise into the carrier, the rows of splints from one magazine alternating with the rows of splints from another, and a guide for the carrier that directs the latter in the same position to the magazine.

21. In a match-machine, the combination of a splint-carrier, a source of supply of splints comprising a plurality of magazines, simultaneously-acting splint-receiving devices for said magazines having splint-grippers, and simultaneously-acting devices for placing the splints from the magazines in the carrier, substantially as and for the purpose described.

22. In a match-machine, the combination of a splint-magazine, a shoulder or support for the splints at one end, and a bar movable longitudinally of the splints for supporting the splints at the other end, substantially as and for the purpose described.

23. In a match-machine, the combination of a vertical splint-magazine, a shoulder at its bottom for supporting the splints at one end, a cross-bar movable longitudinally of the splints, said shoulder and cross-bar having splint-containing recesses, and a transfer device having splint-grippers, substantially as described.

24. In a match-machine, the combination of a source of supply of splints, a splint-carrier, a device for taking splints from the source of supply for placing in the carrier, having splint-grippers, a device for removing matches from the carrier, having splint-grippers, and a movable frame on which both of said devices are mounted, substantially as and for the purpose described.

25. In a match-machine, the combination of a source of supply of splints, a table, a transfer device having splint-grippers, a splint-carrier in which the splints are placed, a second table, a second transfer device having splint-grippers, to take the matches from the carrier and place them on the second table, and a movable frame on which both transfer devices are mounted, substantially as and for the purpose described.

26. In a match-machine, the combination of a source of supply of splints, a table, a transfer device having splint-grippers, a frame on which the transfer device is mounted, and parallel shafts having arms that support said frame, substantially as and for the purpose described.

27. In a match-machine, the combination of a source of supply of splints, a transfer device having splint-grippers comprising a cross-piece with lugs forming stationary jaws, and arms pivoted to said cross-piece forming movable jaws, and means to operate the movable jaws, substantially as and for the purpose described.

28. In a match-machine, the combination of a source of supply of splints, a transfer device having splint-grippers comprising a cross-piece with lugs forming stationary jaws, and arms pivoted to said cross-piece forming movable jaws, and a slide that operates the movable jaws, substantially as and for the purpose described.

29. In a match-machine, the combination of a source of supply of splints, a transfer device having splint-grippers comprising lugs forming fixed jaws and levers, arranged in pairs, and forming movable jaws, and means for operating the movable jaws, substantially as and for the purpose described.

30. In a match-machine, the combination of a source of supply of splints, a transfer device having splint-grippers comprising lugs forming fixed jaws and levers arranged in pairs and forming movable jaws, and a slide for operating the levers, substantially as and for the purpose described.

31. In a match-machine, a splint-transferring device, comprising series of grippers formed each of a fixed jaw and a plurality of movable jaws, the movable jaws coacting with the same side of the fixed jaw, substantially as and for the purpose described.

32. In a match-machine, a splint-transferring device comprising series of grippers, formed each of a fixed jaw, and two levers for each fixed jaw, the movable jaws coacting with the same side of the fixed jaw and constituting movable jaws, substantially as and for the purpose described.

33. In a match-machine, the combination of a match-holder, a table, a transfer device having splint-grippers that removes matches from the holder and delivers them to the table, a match-receptacle and means to remove them from the table to the receptacle, comprising a part that traverses the table, in the path of which the matches are placed, substantially as and for the purpose described.

34. In a match-machine, the combination of a match-holder, a grooved table, a transfer device having splint-grippers, that delivers matches to the table-grooves, a match-receptacle close to the table, and a comb to move the matches from the table-grooves to the receptacle, substantially as and for the purpose described.

35. In a match-machine, the combination of a match-holder, means for removing matches therefrom, a series of traveling match-receptacles having independent doors constituting the outer wall thereof, and means to open said doors at a predetermined point in the path of travel of the receptacles to move them out of the way of matches to permit the latter to pass endwise from the receptacles.

36. In a match-machine, the combination of a match-holder, means for removing matches therefrom, a series of traveling match-receptacles having pivoted doors, and means to automatically open and close the doors at predetermined points in the path of travel of the receptacles, substantially as and for the purpose described.

37. In a match-machine, the combination of a match-holder, a table, a transfer device for the removal of matches from the holder and their delivery to the table, a series of traveling match-receptacles having lateral pivoted doors, means for removing matches from the table to the receptacles, and means for opening and closing said doors at predetermined points in the path of travel of the receptacle, substantially as and for the purpose described.

38. In a match-machine, the combination of a match-holder, a table, a transfer device for the removal of matches from the holder to the table, a series of receptacles having doors constituting the outer wall thereof which, when closed, confine the matches within the receptacles, and when opened permit them to pass endwise therefrom, means for removing matches from the table to the receptacles, a track for the latter, and means for moving them along the track.

39. In a match-machine, the combination of a source of supply of matches, a series of traveling receptacles, having independent side doors, and means for automatically operating said doors at a predetermined point in the path of travel of the receptacles, substantially as and for the purpose described, 40. In a match-machine, the combination of a source of supply of matches, a series of receptacles having independent side doors, a track for the receptacles, and means alongside of the track for automatically operating the doors as they reach said means, substantially as and for the purpose described.

41. In a match-machine, the combination of a source of supply of matches, a series of receptacles, a rocking arm for moving the latter, a shaft along which said arm is movable, and a rocking arm having a fixed axis for engaging the receptacles, substantially as and for the purpose described.

42. In a match-machine, the combination of a match-carrier, vertical guides therefor, a series of match-receptacles, a track therefor, means for the transfer of matches from the carrier to the receptacles, a rocking arm, a shaft parallel with the track, along which the arm is movable, and a rocking arm having a fixed axis, substantially as and for the purpose described.

43. In a match-machine, the combination of a carrier, means for moving the latter by steps comprising a slide that has a pin or pins to enter transverse openings in the carrier, and is reciprocable transversely and longitudinally of the carrier, the movements in these two directions being dissimultaneous, and a carrier-holding device comprising a bar having a pin or pins that engage the carrier-openings, substantially as and for the purpose described.

44. In a match-machine, the combination of a carrier, a slide on one side of the carrier having carrier-engaging means, a bar on the opposite side of the carrier, and having carrier-engaging means, said slide being mounted on said bar, means for simultaneously moving said slide and bar toward and from the carrier, and means for moving the slide longitudinally of the carrier, substantially as and for the purpose described.

45. In a match-machine, the combination of a carrier, a bar having a pin or pins to enter openings in the carrier, means for moving said bar toward and from the carrier, a slide having a pin or pins to engage the openings in the carrier, and mounted on said bar, and means to move the slide in a direction longitudinally of the carrier, substantially as and for the purpose described.

46. In a match-machine, the combination of a carrier having splint-receiving perforations or apertures, springs each having branches in adjacent openings, the fold of the spring taking over the carrier-wall between the openings, and one of the branches being bent to engage the carrier-wall, substantially as and for the purpose described.

47. In a match-machine, the combination of a carrier having splint-receiving openings, V-shaped springs each having branches in adjacent openings, the fold of the spring taking over the carrier-wall between the openings, and one of the branches being bent to engage the opposite side of the carrier, substantially as and for the purpose described.

48. In a match-machine, the combination of a match-carrier composed of independent sections, a guideway therefor having portions that extend in directions that intersect, and a transfer device having section-supports, that is movable from one portion of the guideway to the other, substantially as and for the purpose described.

49. In a match-machine, the combination of a carrier composed of sections, a guideway therefor that changes direction, and wheels having radial slots to receive and support said sections, substantially as and for the purpose described.

In testimony that I claim the foregoing I have hereunto set my hand this 26th day of June, 1899.

ALEXANDER LAGERMAN.

Witnesses:
EMIL JEGERBERG,
H. HANSSON.